United States Patent
Shih et al.

(10) Patent No.: US 9,712,973 B2
(45) Date of Patent: Jul. 18, 2017

(54) METHOD OF SELECTING A SIM FOR A LOCATION SERVICE AND MULTI-SIM DEVICE UTILIZING THE SAME

(71) Applicant: MediaTek Inc., Hsin-Chu (TW)

(72) Inventors: Wei-Feng Shih, Taichung (TW); Chih-Hung Lee, Kaohsiung (TW); Ming Lee, Taichung (TW); Yuh-Hwang You, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 58 days.

(21) Appl. No.: 14/259,498

(22) Filed: Apr. 23, 2014

(65) Prior Publication Data

US 2015/0312717 A1 Oct. 29, 2015

(51) Int. Cl.
*H04W 4/02* (2009.01)
*H04W 8/18* (2009.01)
*H04W 64/00* (2009.01)

(52) U.S. Cl.
CPC ........... *H04W 4/025* (2013.01); *H04W 8/183* (2013.01); *H04W 64/00* (2013.01)

(58) Field of Classification Search
CPC ................................ H04W 4/025; H04W 8/20
See application file for complete search history.

(56) References Cited

U.S. PATENT DOCUMENTS

| | | | | |
|---|---|---|---|---|
| 6,804,711 B1* | 10/2004 | Dugan | .............. | H04M 3/42136 370/385 |
| 2005/0153706 A1* | 7/2005 | Niemenmaa | ............ | H04W 8/12 455/456.1 |
| 2010/0311444 A1* | 12/2010 | Shi | ......................... | H04W 4/003 455/466 |
| 2014/0256283 A1* | 9/2014 | Lin | ........................ | H04W 4/025 455/404.2 |
| 2015/0099516 A1* | 4/2015 | Nayak | ............... | H04W 52/0229 455/435.3 |

* cited by examiner

*Primary Examiner* — Chuong A Ngo
(74) *Attorney, Agent, or Firm* — McClure, Qualey & Rodack, LLP

(57) ABSTRACT

A method of selecting a SIM for a location service and a multi-SIM device utilizing the same are disclosed. The method, adopted by a multi-SIM device, includes: acquiring Secure User Plane Location (SUPL) information from a corresponding communications network which each SIM is in connection with; determining which communications network supports a location service based on the SUPL information; and requesting the location service on a SIM that is in connection with the supported communications network.

20 Claims, 9 Drawing Sheets

METHOD OF SELECTING A SIM FOR A LOCATION SERVICE AND MULTI-SIM DEVICE UTILIZING THE SAME

BACKGROUND OF THE INVENTION

Field of the Invention

The present invention relates to telecommunications, and in particular relates to a method of selecting a SIM for a location service and a multi-SIM device utilizing the same.

Description of the Related Art

It is often desirable, and sometimes necessary, to know the location of a terminal such as a mobile phone. The Secure User Plane Location (SUPL) specifications produced by the Open Mobile Alliance (OMA) are an IP based protocol for Assisted GPS to receive information of GPS satellites quickly via IP instead of slowly receiving over GPS satellite signaling. The SUPL specifications allow applications on a mobile phone to obtain the geographic location thereof. Currently, two versions of SUPL are defined in OMA specifications—SUPL version 1.0. SUPL 1.0 supports many positioning methods but provides only basic location capabilities using 2G or 3G cell identifiers (ID). SUPL 2.0, on the other hand, contains many more location capabilities including support for periodic, triggered and historic location, providing more precise location information using 4G cell IDs. It is possible that future versions of SUPL will eventually be developed that would support even more location services.

A multi-SIM (subscriber identity module) device, including particularly mobile phones, personal digital assistants, tablet and laptop computers, mobile WiFi router and mobile USB dongle can hold two or more SIM cards. Hereinafter "SIM" and "SIM card" will be used interchangeably. The multi-SIM device allows a user to operate with a corresponding number of communications networks and/or arrangements without the need to carry two or more wireless devices. Each SIM contains a unique international mobile subscriber identity (IMSI) and can subscribe to a communications network which supports a particular SUPL version, or even not any SUPL version. Because the multi-SIM device contains multiple SIMs, a method of automatic selecting a SIM for delivering location services is required.

BRIEF SUMMARY OF THE INVENTION

A detailed description is given in the following embodiments with reference to the accompanying drawings.

A method adopted by a multi-SIM device is disclosed, the method comprising: acquiring Secure User Plane Location (SUPL) information from a corresponding communications network which each SIM is in connection with; determining which communications network supports a location service based on the SUPL information; and requesting the location service on a SIM that is in connection with the supported communications network.

Another embodiment of a multi-SIM device is provided, containing a plurality of SIMs, a receiver, a transmitter, and a select circuit. Each SIM is configured to connect with a corresponding communications network. The receiver is configured to acquire Secure User Plane Location (SUPL) information from the corresponding communications network which each SIM is in connection with. The select circuit is configured to determine which communications network supports a location service based on the SUPL information. The transmitter is configured to request the location service on a SIM that is in connection with the supported communications network.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
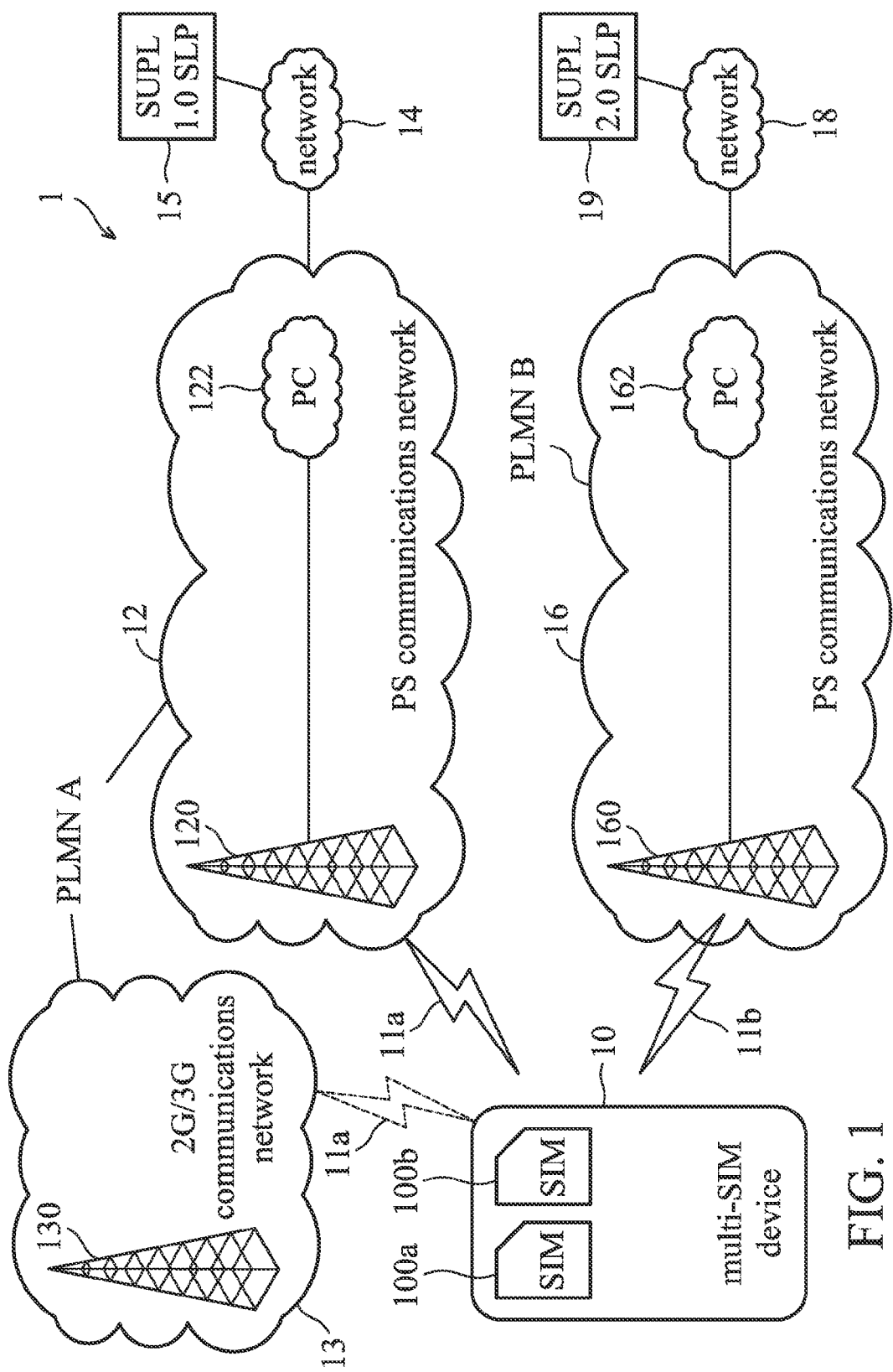
FIG. 1 is a schematic diagram of a communications environment 1.

The following description is of the best-contemplated mode of carrying out the invention. This description is made for the purpose of illustrating the general principles of the invention and should not be taken in a limiting sense. The scope of the invention is best determined by reference to the appended claims.

Various aspects are described herein in connection with a multi-SIM device, which can also be referred to as a system, device, SUPL enabled terminal (SET), wireless terminal, subscriber unit, subscriber station, mobile station, mobile, mobile device, remote station, remote terminal, access terminal, user terminal, terminal, communication device, wireless device, portable communication device, wireless communication device, user agent, user device, or user equipment (UE). The multi-SIM device may be a cellular telephone, a satellite phone, a cordless telephone, a Session Initiation Protocol (SIP) phone, Personal Digital Assistant (PDA), a laptop computer, a handheld device having wireless connection capability, a computing device, or other processing device connected to a wireless modem. Moreover, a base station described herein may be utilized for communicating with wireless terminal(s) and may also be referred to as an access point, a node B, or an evolved node B (eNB).

A subscriber identity module (SIM) card referred herein may be a universal SIM (USIM) card for Wideband Code Division Multiple Access (W-CDMA) or Time Division-Synchronous Code Division Multiple Access (TD-SCDMA) system, a removable User Identity Module (R-UIM) or a Code Division Multiple Access (CDMA) Subscriber Identity Module (CSIM) card for a CDMA2000 system. The SIM card contains an international mobile subscriber identity (IMSI) and a related key used to identify and authenticate subscribers on a mobile station (MS). The mobile station is immediately programmed after the SIM card(s) are plugged therein. The SIM cards may also be programmed to display custom menus for personalized services.

The location techniques described herein are used in Secure User Plane Location (SUPL), which is an Internet Protocol (IP) based protocol adopted by Packet Switching (PS) communications systems, such as General packet radio service (GPRS), Enhanced Data rates for GSM Evolution (EDGE), Universal Mobile Telecommunications System (UMTS), Code Division Multiple Access 2000 (CDMA2000), Enhanced Voice-Data Optimized (EVDO), High Speed Packet Access (HSPA), HSPA plus (HSPA+), Time Division-Synchronous Code Division Multiple Access (TD-SCDMA), Worldwide Interoperability for Microwave Access (WiMAX), Long Term Evolution (LTE), LTE-Advanced (LTE-A), or other PS-based communication techniques.

A "location" as referred to herein being information associated with a whereabouts of an object according to a point of reference. Such a location may be represented as geographic coordinates such as latitude and longitude. Alternatively, such a location may be represented as a street address, municipality or other governmental jurisdiction, postal zip code and/or the like. Examples of location representations according to embodiments and claimed subject matters are not limited in these respects. A SUPL Enabled Terminal (SET) may determine its location based on navigation signals from an Assisted GPS (A-GPS), Assisted Global Navigation Satellite System (A-GNSS), Observed Time Difference Of Arrival (OTDOA), and other location service systems. The A-GPS estimates a position of a cell by regularly downloading orbital information of Global Positioning System (GPS) satellites onto A-GPS servers, and when a location is needed, a SET downloads the orbital information from the A-GPS servers using a mobile communications network.

A network server such as an SLP and a mobile device may agree upon a particular SUPL version to utilize for a SUPL session. One technique of negotiating a SUPL version may involve retrying a SUPL session after a failed attempt, requiring extra delay.

The embodiments described herein utilize a Dual-SIM configuration of a wireless device, which allows the use of two data services on one device. The scope of the invention, however, is not limited to a Dual-SIM device, and can be extended to a multi-SIM device, based on the principles outlined in the disclosure.

FIG. 1 is a schematic diagram of a communications environment 1, incorporating a multi-SIM device 10 which carries two subscriber identity module (SIM) cards 100a and 100b simultaneously to access the same or different Public Land Mobile Networks (PLMN) after camping on cells. The mobile communications environment 1 contains a PLMN A, a PLMN B, networks 14 and 18 and SUPL Location Platforms (SLP) 15 and 19 (SUPL servers). The multi-SIM device 10 can establish a connection 11a to the PLMN A on the SIM 100a and establish a connection 11b to the PLMN B on the SIM 100b. When requesting for a location service, the multi-SIM device 10 can initiate a SUPL session on the SIM 100a to communicate with the SLP 15 through the PS communications network 12 and the network 14, or on the SIM 100b to communicate with the SLP 19 through the PS communications network 16 and the network 18. The multi-SIM device 10 can automatic select one from the SIMs 100a and 100b to establish the SUPL session and acquire the location services. The location services include phone tracking services, personalized weather services, location-based coupons or advertising, location-based games.

Accordingly, the multi-SIM device 10 communicates with the SLP 15 or 19 using the SUPL protocol. In some embodiments, when a dual-SIM mobile phone communicates with the SLP 15 or 19 using a SUPL version exceeding that that of the SLP 15 or 19, or the SLP 15 or 19 fails to recognize base station identifier information sent by the dual-SIM mobile phone, the SLP 15 or 19 may return a SUPL failure message or even not respond to a SUPL message sent by the mobile phone. Consequently, the SLP 15 or 19 cannot provide the location service to the dual-SIM mobile phone. In cases as such, in order to obtain the location service, the dual-SIM mobile phone is forced to fall back to a lower SUPL version which the SLP can understand and communicate with. The SUPL version fallback operation involves that the mobile phone takes measurements from another communications network of the same PLMN, or reselects a base station in another communications network of the same PLMN to establish a connection and take measurements. In other embodiments, when a dual-SIM mobile phone sends a SUPL initialization message to a communications network not connecting to or not being able to reach any SLP, the dual-SIM mobile phone will also not receive the location service from the current PLMN on a current SIM and has to be manually switched to another PLMN on another SIM for acquiring the location service. Whether it is required an end user to manually reselect a communication network of the same PLMN or manually reselect a different PLMN, the reselection operations and procedures will cause inconveniences and bad user experiences to an end user.

The multi-SIM device 10 acquires SUPL information from the remote SLPs 15 and 19 by polling and utilizes the SUPL information to automatically select a SIM for delivering the location service, reducing a number of occurrences of SUPL version fallback. The SUPL information includes supported SUPL versions, SLP server status, supported SUPL positioning methods, and other SUPL parameters of the SLPs 15 and 19. The automatic SIM selection methods adopted by the multi-SIM device 10 for delivering the location services are detailed and embodied in FIGS. 2 through 8.

A PLMN may include one or more communications networks. The PLMN A includes a PS communications network 12 and a 2G/3G communications network 13, and the PLMN B includes a PS communications network 16. The PS communications network 12 may be a LTE, LTE-A, WiMAX, or another PS network, and contains a base station 120 and a packet core (PC) 122. The 2G/3G communications network 13 may be a GSM, GPRS, or UMTS network, and contains a base station 130, a radio network controllers (not shown), and a core network (not shown). The PS communications network 16 may be a LTE, LTE-A, WiMAX, or another PS network, and contains a base station 160 and a packet core (PC) 162. Although only one base station is illustrated in each communications network, it should be appreciated that more than one base station may be utilized in each communications network to provide radio coverage. Each SIM may establish a connection to one communications network of a PLMN. For example, the SIM 100a may connect to the PS communications network 12 and the SIM 100b may connect to the PS communications network 16.

The networks 14 and 18 may be hard-wired, wireless, or partially wireless, and may be private or public. For example, the network 14 may be an intranet or Internet which the PS communications network 12 can communicate with using the IP technology, and the network 18 may be an intranet or Internet which the PS communications network 16 can communicate with using the IP technology.

The SLPs 15 and 19 are location servers (LS) that can receive positioning information for a target device and determine location information for the target device. For example, the SLPs 15 and 19 can regularly receive and store positioning information from GPS satellites and determine location information for the multi-SIM device 10 upon a request. In general, the positioning information may be any information used to support positioning. For example, the positioning information may contain measurements and a coarse location estimate. Location information of a target device may be any information related to the location of the target device. For example, the location information may contain reference time, reference location, and assistance data for making measurements of signals for positioning. The SLPs 15 and 19 may communicate with the multi-SIM device 10 with the SUPL protocol. The SLPs 15 and 19 may support one or multiple versions of SUPL. For example, the SLP 15 supports only SUPL 1.0, the SLP 19 supports only SUPL 2.0. In some embodiments, the SLP 15 and 19 may support SUPL 1.0, SUPL 2.0, future version of SUPL, or a combination thereof.

The SIM cards 100a and 100b which are employed by the wireless device 10 may be a SIM, USIM, R-UIM, CSIM, or other types of SIM card subscribed to PLMN A and PLMN B respectively. In the embodiment, the SIM 100a subscribes to the PLMN A and the SIM 100b subscribes to the PLMN B. The multi-SIM device 10 is also referred to as a SUPL Enabled Terminal (SET), which supports an SUPL defined interface and can host a location requesting application. The multi-SIM device 10 is a mobile or stationary device whose location is to be determined based on A-GPS, A-GNSS, OTDOA, or other location determination/estimation mechanisms. The multi-SIM device 10 may communicate with one or more base stations in the PLMN A and PLMN B on SIMs 100a and 100b. The multi-SIM device 10 may also communicate peer-to-peer with other terminal devices. The multi-SIM device 10 may support one or multiple versions of SUPL. For example, the multi-SIM device 10 may support only SUPL 1.0 or only SUPL 2.0, whereas in another example, the multi-SIM device 10 may support both SUPL 1.0 and SUPL 2.0, or more than 2 versions of SUPL.

The multi-SIM device 10 may be a Dual-SIM Dual Standby (DSDS), which allows two SIMs to be on standby waiting for a call, or a Dual-SIM Full Active (DSFA) device, which allows two SIMs to be able to establish calls concurrently. In either case, the multi-SIM device 10 can select a SIM for delivering the location service according to the SUPL information acquired on the SIMs 100a and 100b, and initiate the location service on the selected SIM. The SUPL information may be acquired upon the multi-SIM device 10 is turned on, or a service status of one of the SIMs is changed, or receiving a location service request. In some embodiments, when receiving location services requests on the SIM 100a, the multi-SIM device 10 is configured to obtain RAT information of the PS communications networks 12 and 16 and poll the SUPL information from the SLPs 15 and 19 through the SIMs 100a and 100b, and select a SIM for initiating the SUPL session based on the RAT information and the SUPL information.

The multi-SIM device 10 employs a select module to select a SIM to initiate an SUPL session. Please refer to FIG. 2 for a block diagram of an exemplary dual-SIM device 10 employing the Dual-SIM Dual Standby feature, automatically selecting a SIM card for location services according to an embodiment of the invention. The dual-SIM device 10 contains hardware circuit components and firmware/software codes to provide the automatic SIM selection for location services, including two SIM cards 100a and 100b, a baseband processor 22, an RF circuit 24, an antenna 26 and a memory device 20 which contains codes and instructions of a select module 200, an application module 202, and modem modules 204 and 206.

The SIMs 100a and 100b, the RF circuit 24 and the memory device 20 are connected to the baseband processor 22. The RF circuit 24 is configured to provide signal processing of the RF signals received and sent over the SIM connections corresponding to the SIMs 100a and 100b via the antenna 26. When executed, the select module 200, the application module 202, and the modem modules 204 and 206, will cause the baseband processor 22 to execute the codes and instructions therein, and perform steps and functions of selecting an active SIM for launching the location services, and specific functions concerning with modem operations, respectively.

Specifically, the modem module 204 is configured to process the data for a SIM connection established on the SIM 100a, whereas the modem module 206 is configured to process the data for a SIM connection established on SIM 100b. The modem modules 204 and 206 may be implemented as firmware or software, performing various modem operations and functions for data connections on the SIM 100a and 100b. The select module 200, implemented by firmware or software, communicates and interacts with the modem modules 204 and 206 and carries out the automatic SIM selection procedure for the location services according to the embodiment of the invention. The application module 202, implemented by software, communicates and interacts with the select module 200 and performs application programs such as a user interface which allows the user to enter a SIM card preference for required services.

Figure 2:
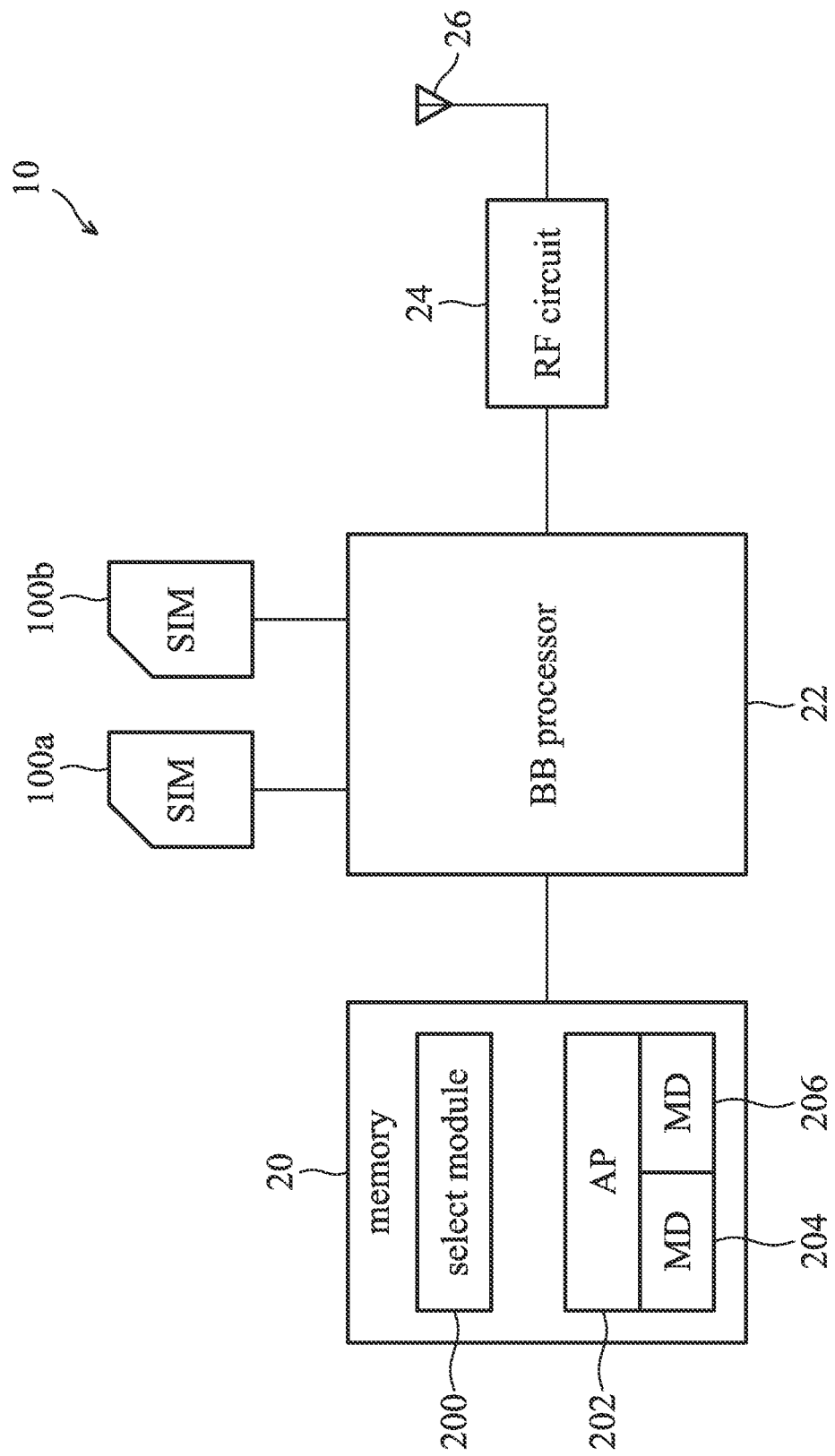
FIG. 2 is a block diagram of a multi-SIM device 10 according to an embodiment of the invention.

Although the Dual-SIM Dual Standby structure is adopted by the embodiment in FIG. 2, people skilled in the art would recognize that the Dual-SIM Full Active (DSFA) structure can also be adopted by the dual-SIM device 10 in FIG. 1, with two sets of RF circuits and antennas. In DSFA implementation, each set of RF circuit and antenna is dedicated to a SIM card. For example, the dual-SIM device 10 can establish connections to the PS communications networks 12 and 16 concurrently, and upon receiving request, select one of the SLPs through the PS communications networks 12 or 16 to acquire the location services.

Figure 3:
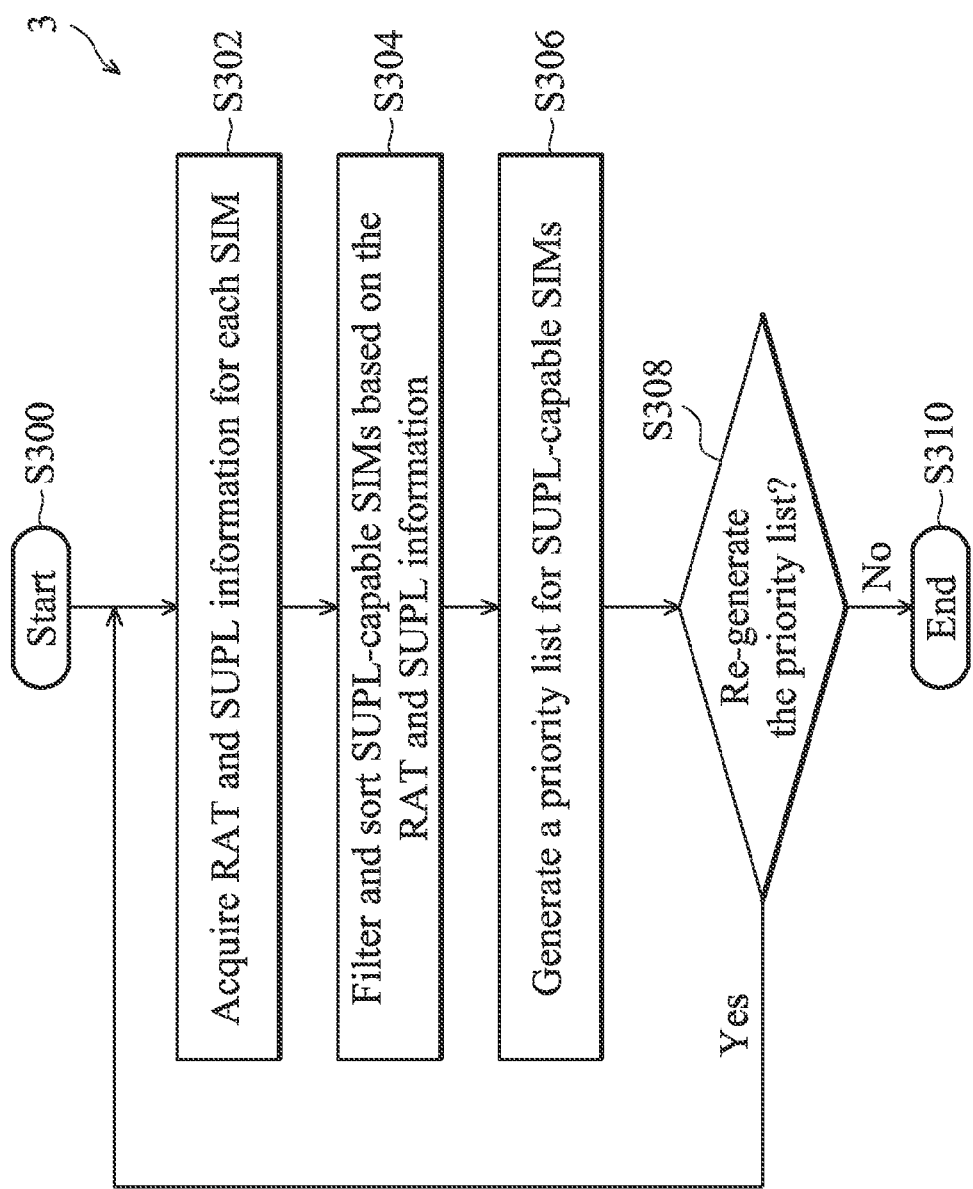
FIG. 3 is a flowchart of a generation method 3, generating a priority list of SIMs for providing a location service according to various embodiments of the invention.

The select module 200 contains codes and instructions which performs a generation method 3 in FIG. 3, which generates a priority list of SIMs for providing a location service according to various embodiments of the invention.

The generation method 3 is initiated upon the multi-SIM device 10 is powered on, or a service status of one of the SIMs is changed, or receiving a location service request (S300). As the dual-SIM device 10 moves in and out of cells, the SIMs 100a and 100b may change camped telecommunications networks, and the service statuses thereof may be changed along with the changed telecommunications networks, since, the SIM 100a or 100b may change form camping on a telecommunications network which can provide normal services to another one which can provide only limited or no service, or vice versa. For example, when the SIM 100a changes from one telecommunications network that provides limited services only to another one that provide normal services, the generation method 3 will be initiated to re-generate another list of SIMs for delivering the location services.

Next, the select module 200 of the multi-SIM device 10 acquires the RAT information and the SUPL information on the all available SIMs (S302), wherein the RAT information may be service statuses and data rates supported by the camped communications networks, the SUPL information may be SUPL versions, SLP server status, and SUPL positioning methods supported by the connected SLPs. The service status provided by the camped communications network may be a normal service, a limited service, or no service. For example, the SIM 100*a* may camp on a communications network providing limited services and the SIM 100*b* may camp on a communications network providing normal services. The data rate supported by the communications network may be associated with the type of the communications network. For example, an LTE network can support up to 100M bps, an UMTS network can support up to 42M bps, and a GSM network can support 9.6 k bps. The SUPL versions supported by the SLP server may be 1.0, 2.0, and other versions defined by OMA. For example, the SLP 15 may support SUPL version 1.0 and the SLP 19 may support SUPL version 2.0. The SUPL positioning methods supported by the SLP server may be the A-GPS, A-GNSS, or OTDOA. For example, the SLP 15 may support the A-GPS positioning method and the SLP 19 may support the OTDOA positioning method. The SLP server status may be available or unavailable. For example, the SLP 15 may be available for providing the location services, and the SLP 19 may be unavailable. In one example, if the multi-SIM device 10 contains 3 SIMs, and the SUPL information acquired on a SIM 1 are SLP server status available, SUPL versions 2.0 supported, and the supported SUPL positioning methods being A-GPS, A-GNSS, and eCID; the SUPL information acquired on a SIM 2 are SLP server status unavailable; the SUPL information acquired on a SIM 3 are SLP server status available, SUPL versions 1.0 supported, and the supported SUPL positioning method being A-GPS.

Having acquired the RAT information and the SUPL information of the camped communications network on each SIM, the select module 200 can filter and sort the SUPL-capable SIMs using the RAT and SUPL information (S304). To begin with, the select module 200 can eliminate any SIM that is on a communications network providing limited or no service, or an unavailable SLP server. Because the location services are normal IP-based services, they can only be provided by a communications network with normal services. Further, the location services cannot be obtained from the unavailable SLP server. As a consequence, only SIMs on normal service communications networks and available SLP servers are SUPL-capable and can be selected by the select module 200 for the location services. For example, if the multi-SIM device 10 contains 2 SIMs, and a SIM 1 is on a LTE network providing limited service and an available SLP, and a SIM 2 is on a UMTS network providing normal service and an available SLP, then the select module 200 will remove the SIM 1 and keep the SIM 2 for the location services.

The select module 200 then sorts a priority list of the SUPL-supported SIMs according to the RAT and SUPL information (S306). The select module 200 can sort the priority list based on the data rates supported by the communications networks, the supported SUPL versions of the SLP servers, user preference, the supported SUPL positioning methods of the SLP servers, other predefined factors such as charging rates, roaming (VPLMN) functions, or a combination thereof. For example, if there are 2 SUPL-capable SIMs, the first SUPL-capable SIM 1 is on a LTE network and the second SUPL-capable SIM 2 is on a GSM network, then the select module 200 may arrange the first SIM before the second SIM on the priority list. In another example, if the multi-SIM device 10 supports SUPL version 2.0, a first SLP connecting to a first SUPL-capable SIM of the multi-SIM device 10 supports SUPL version 2.0 and a second SLP connecting to a second SUPL-capable SIM of the multi-SIM device 10 supports SUPL version 1.0, the select module may arrange the first SIM before the second SIM on the priority list, since, if selecting the second SUPL-capable SIM, the multi-SIM device 10 will have to perform a SUPL version fallback. After the priority list is determined, the select module 200 can choose a SIM from the priority list upon a location service request.

The select module 200 can regularly determine whether a condition of re-generating the priority list has occurred, wherein the condition of re-generating the priority list includes: the multi-SIM device 10 is restarted, or the service status of one of the SIMs is changed, or receiving a location service request (S308). If so, then the generation method 3 can return to Step S302 and repeat Steps S302 through S308 for re-generating the priority list of the SUPL-capable SIMs. If the condition of re-generating the priority list has not occurred, then the generation method 3 is completed and exited (S310).

Figure 5A:
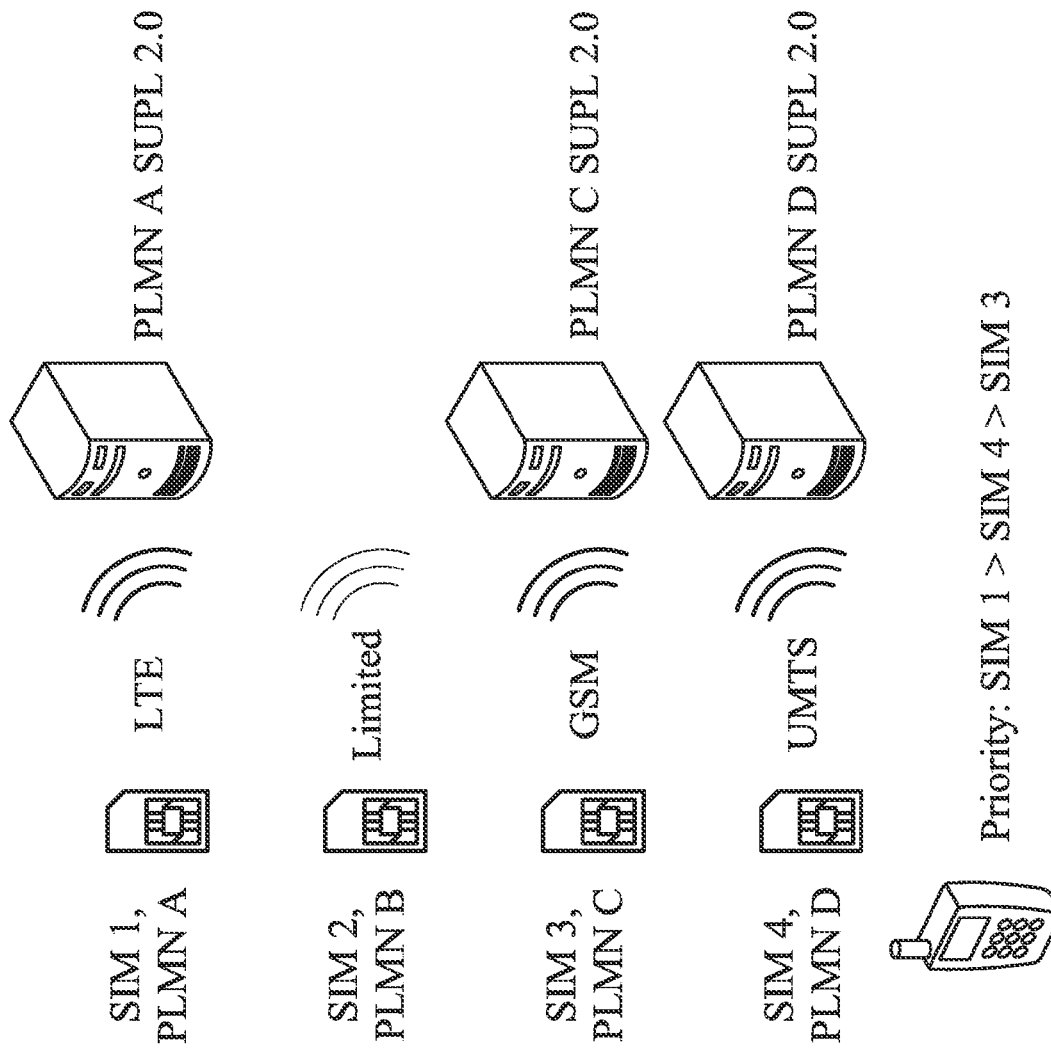
FIGS. 5A and 5B illustrate examples of selecting a SIM for providing a location service using SUPL according to embodiments of the invention.
Figure 5B:
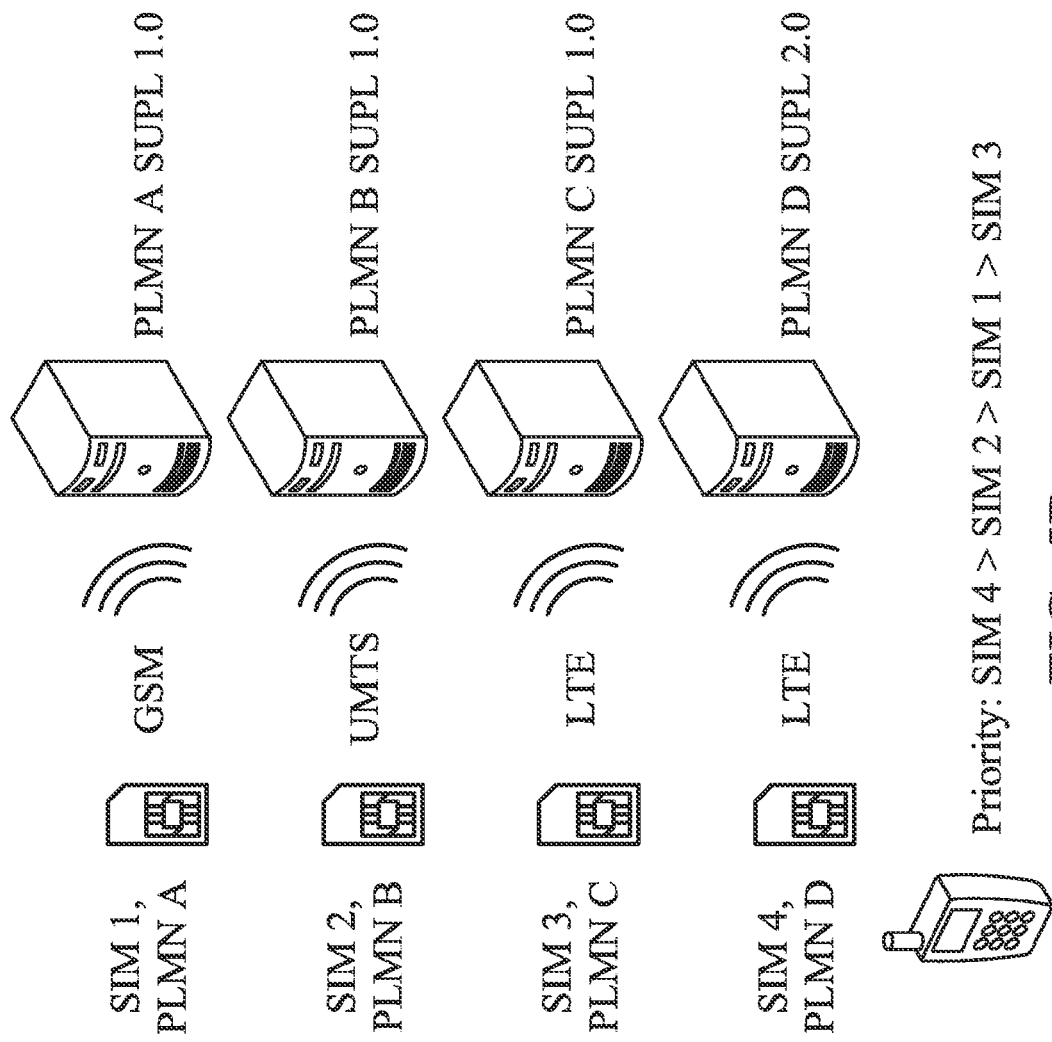

FIGS. 5A and 5B illustrate examples of generating a priority list for providing location services using SUPL according to embodiments of the invention. Referring to FIG. 5A, depicting 4 SIMs carried on the multi-SIM device 10, wherein a SIM 1 camps on an LTE network of a PLMN A, connected to a SLP with a SUPL version 2.0; a SIM 2 camps on a communications network with limited services; a SIM 3 camps on a GSM network of a PLMN C, connected to a SLP with a SUPL version 2.0; and a SIM 4 camps on a UMTS network of a PLMN D, connected to a SLP with a SUPL version 2.0. According to the priority list generation method 3 in FIG. 3, the multi-SIM device 10 eliminates any limited service and no service SIM, and sorts the remaining SIMs according to the data rates and supported SUPL versions thereof. Therefore, the multi-SIM device 10 removes the SIM 2 from the SUPL-capable SIM list and arranges the remaining SIMs in a priority order of SIM 1>SIM 4>SIM 3 on the priority list, based on that the data rates of the LTE network exceeds that of the UMTS network, which in turn exceeds that of the GSM network.

Turning to FIG. 5B for another priority list generation example, which also depicts 4 SIMs carried on the multi-SIM device 10, wherein a SIM 1 camps on a GSM network of a PLMN A, connected to a SLP with a SUPL version 1.0; a SIM 2 camps on a UMTS network of a PLMN B, connected to a SLP with a SUPL version 1.0; a SIM 3 camps on an LTE network of a PLMN C, connected to a SLP with a SUPL version 1.0; and a SIM 4 camps on another LTE network of a PLMN D, connected to a SLP with a SUPL version 2.0. According to the priority list generation method 3 in FIG. 3, the multi-SIM device 10 eliminates any limited service and no service SIM, and sorts the remaining SIMs according to the data rates and supported SUPL versions thereof. In this case, the multi-SIM device 10 arranges the remaining SIMs in a priority order of SIM 4>SIM 2>SIM 1>SIM 3 on the priority list, based on that the data rates of the LTE network exceeds that of the UMTS network, which in turn exceeds that of the GSM network, also the SLP on the PLMN D has the same SUPL version as the multi-SIM device 10, while the other SLPs use the SUPL version less than the multi-SIM device 10.

The generation method 3 allows the multi-SIM device 10 to produce a priority list of SUPL-capable SIMs using the SUPL and RAT information, so that later when receiving a location service request, the multi-SIM device 10 can select a SIM from the priority list for delivering the location services.

Figure 4:
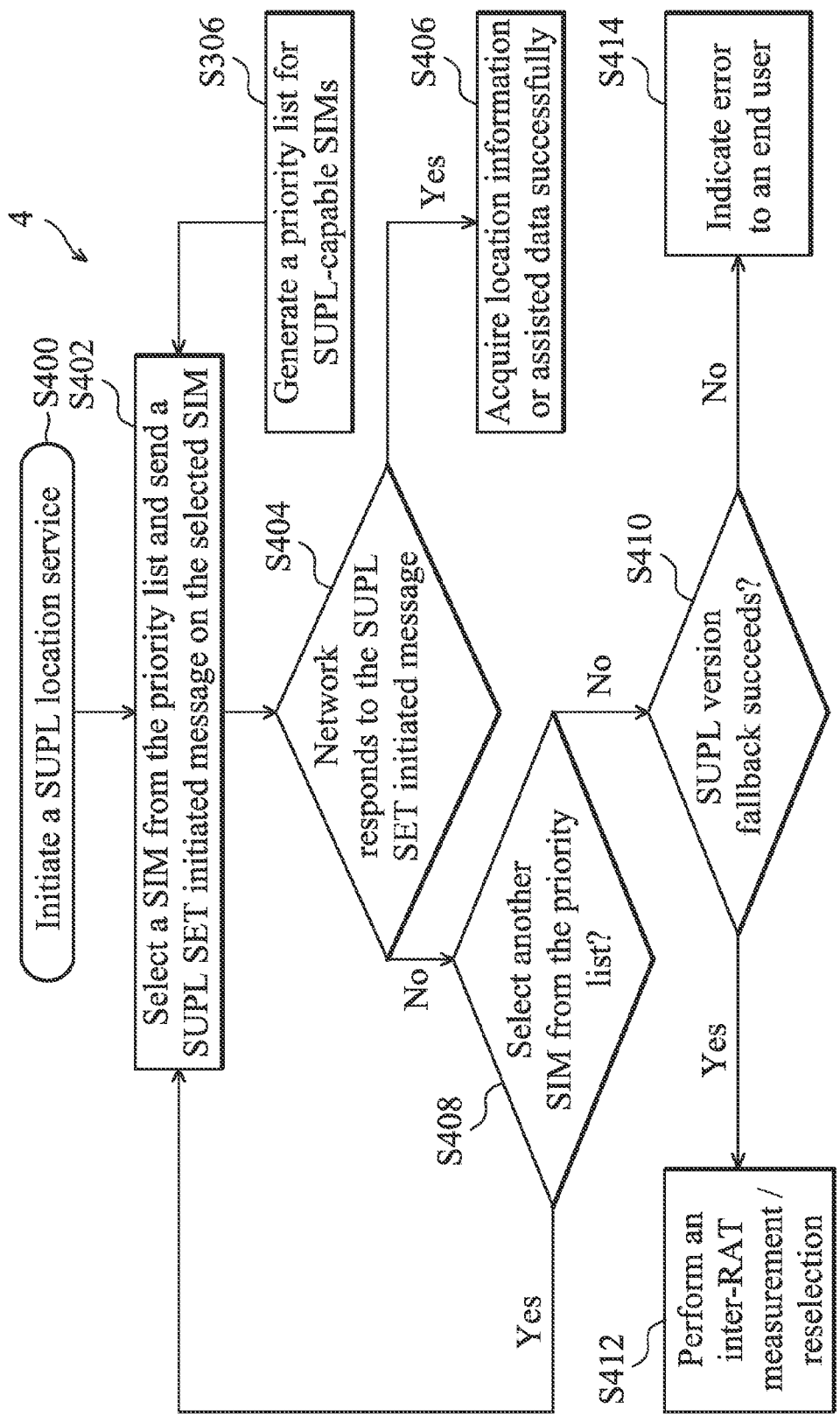
FIG. 4 is a flowchart of a selection method 4, selecting a SIM for providing a location service using SUPL according to various embodiments of the invention.

FIG. 4 is a flowchart of a selection method 4, selecting a SIM for providing a location service using SUPL according to various embodiments of the invention. The selection method 4 incorporates the multi-SIM device 10 in FIGS. 1 and 2. The selection method 4 is performed after the generation method 3 has generated the priority list for the SUPL-capable SIMs, and is initiated when the multi-SIM device 10 receives a location service request, either originated from an end user or an application program.

Upon startup, the multi-SIM device 10 is configured to adopt the user plane for providing the location services according to a UE profile, the selection method 4 is initiated upon receiving a location service request (S400).

Next, the select module 200 selects a highest priority item from the priority list from Step S306 as the SIM for initiating a SUPL session, so that an end user or an application program can cause the baseband processor 22 to send a SUPL SET initiated message to a communications network on the selected SIM (S402). The SUPL SET initiated message contains a cell ID of a neighboring base station of the multi-SIM device. In some embodiments, the select module 200 may record the selected SIM as a preferred SIM card for a SUPL service or a location service, and reuse the preferred SIM card on the next location service request. For example, in FIG. 1, if the SIM 100b is selected, the baseband processor 22 will send the SUPL SET initiated message containing a cell ID of the base station 160 to the communications network 16 on the SIM 100b.

After the SUPL SET initiated message is sent, the select module 200 is configured to wait for a SUPL response message from the communications network for a predetermined period of time and determine whether the communications network has responded the SUPL SET initiated message and accepted the SUPL session request (S404). If the communications network responds with accepting the SUPL session request, the multi-SIM device 10 can acquire location information or assisted data subsequently from the communications network (S406). Upon receiving the location information or assisted data from the communications network, the multi-SIM device 10 can determine and/or estimate the location information based on the assisted data for A-GPS, A-GNSS or OTDOA positioning methods. For example, the multi-SIM device 10 contains a GNSS kernel (not shown) to determine the location information based on the A-GNSS positioning method. In another example, the multi-SIM device 10 contains an OTDOA Digital Signaling Processor (DSP) (not shown) to determine the measurement information based on the OTDOA positioning method. The determined or estimated location information is sent to the end user or application program for use.

If the communications network does not respond the SUPL session request message (SUPL START) in the predetermined period of time, or responds with a SUPL rejection message or failure message (SUPL END with error StatusCode), the select module 200 is configured to remove the highest priority SIM or the preferred SIM from the priority list and determine whether there is another SIM in the priority list other than the rejected or failed SIM (S408). If so, the selection method 4 goes back to Step S402 for choosing the next highest priority item from the priority list and carries out Steps S402 through S408 again for acquiring the location services. If there is no item left in the priority list, the multi-SIM device 10 has to determine whether one of the SUPL-capable SIMs can be used to perform a SUPL version fallback (S410).

If there are one or more SUPL-capable SIMs in the original priority list, which can be used for performing the SUPL version fallback, the select module 200 is configured to select the one SIM from the original priority list to perform an inter-RAT measurement or cell reselection (S412). Specifically, the select module 200 is configured to select firstly the SIM which can provide an inter-RAT measurement and an inter-RAT cell ID for the SUPL version fallback. The inter-RAT measurement may be measured during an autonomous gap or a measurement gap which is created by the multi-SIM device 10 or is a scheduled Discontinuous Reception (DRX) window, where a connection with the serving cell is suspended and measurements on the neighboring inter-RAT cells are taken. For example, in FIG. 1, the multi-SIM device 10 supports SUPL version 2.0 and the SLP 15 supports SUPL version 1.0, the multi-SIM device 10 performs the SUPL version fallback on the SIM 100a by acquiring cell measurements from the 2G/3G communications network 13 and reporting the 2G/3G cell measurements to the SLP 15 for the location services.

When no SIM is available for the inter-RAT measurement, the baseband processor 22 is configured to enquire an end user about whether the inter-RAT cell reselection should be adopted for the location services. If the baseband processor 22 receives a confirmation for using the inter-RAT cell reselection for the location services, the select module 200 is then configured to select the SIM which can be reselected to another cell in another RAT for the SUPL version fallback. For example, in FIG. 1, the multi-SIM device 10 supports SUPL version 2.0 and the SLP 15 supports SUPL version 1.0, if the multi-SIM device 10 is unable to acquire neighboring 2G/3G cell measurements by the inter-RAT measurement, the multi-SIM device 10 performs the SUPL version fallback on the SIM 100a by firstly indicating to an end user that a 2G or 3G inter-RAT cell reselection is required for delivering the location services. If the end user confirms the 2G or 3G inter-RAT cell reselection, the multi-SIM device 10 can select the SIM 100a to camp on the base station 130, take the measurements of neighboring cells in the 2G/3G communications network 13, and send the cell ID and the measurement results of the neighboring cells in the 2G/3G communications network 13 to the SLP 15 for obtaining the location services by the SUPL version 1.0.

When no SUPL-capable SIM is available for the SUPL version fallback either, the baseband processor 22 is configured to inform an end user that an error has occurred and there is no SIM available for the location services (S414). In some embodiments, the baseband processor 22 is configured to display an error message on a screen (not shown) of the multi-SIM device 10, indicating that no SIM is available for the location services.

The selection method 4 allows the multi-SIM device 10 to select a SIM from a list of SUPL-capable SIMs to deliver the location services, avoiding possible SUPL version fallbacks and providing an increased user experiences.

Figure 6:
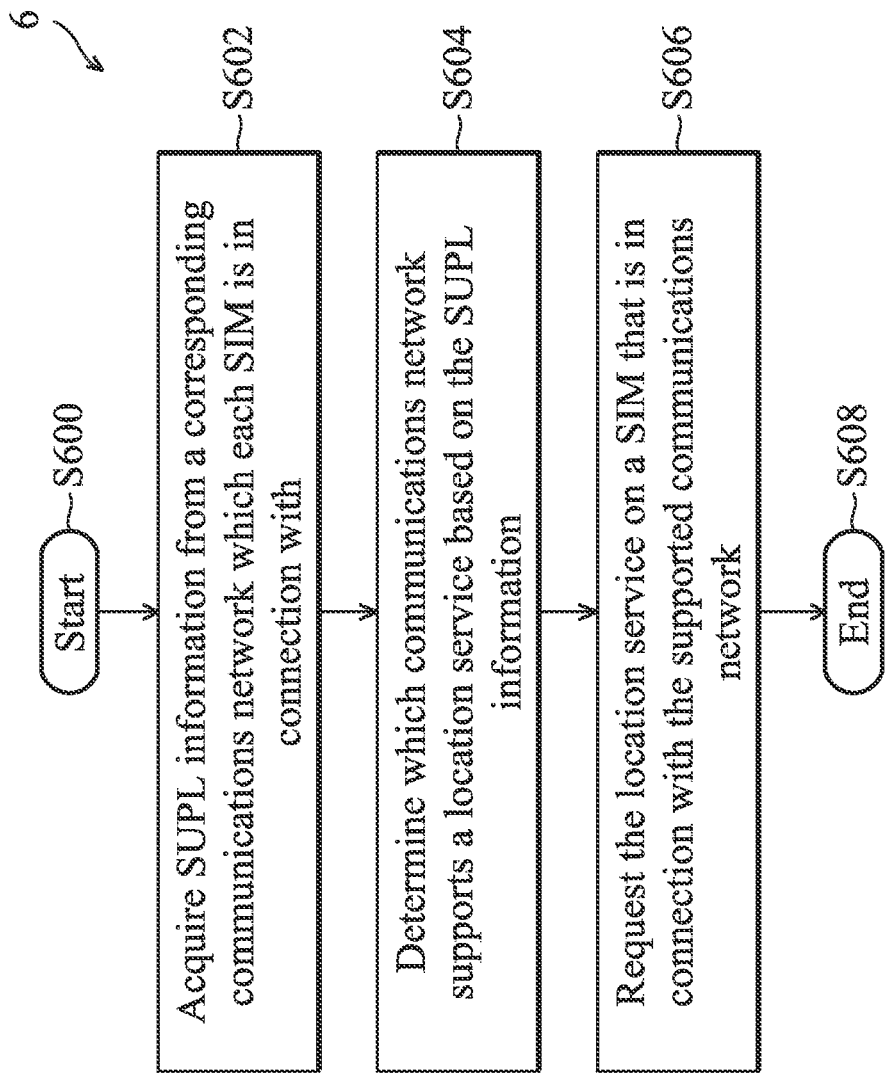
FIG. 6 is a flowchart of a selection method 6, selecting a SIM for providing a location service using SUPL according to another embodiment of the invention.

FIG. 6 is a flowchart of a selection method 6, selecting a SIM for providing a location service using SUPL according to another embodiment of the invention, incorporating the multi-SIM device 10 in FIG. 1. The selection method 6 is initiated upon the multi-SIM device 10 is turned on or restarted, or a service status of one of the SIMs is changed, or receiving a location service request.

Upon startup of the selection method 6, the multi-SIM device 10 is configured to adopt the user plane for the location services (S600), and acquire SUPL information from a corresponding communications network which each SIM is in connection with (S602). The SUPL information may be any information used to support the SUPL protocol, and includes the supported SUPL versions, SLP server status, supported SUPL positioning methods, and other SUPL parameters of the SLPs which can be accessed via the communications network. For example, in FIG. 1, the multi-SIM device 10 can acquire the SUPL information of the SLP 15 via the PS communications network 12 on the SIM 100a, and acquire the SUPL information of the SLP 19 via the PS communications network 16 on the SIM 100b. In some embodiments, the multi-SIM device 10 also obtains RAT information such as supported data rates and charging rates of the communications network corresponding to each SIM.

Next, the multi-SIM device 10 is configured to determine which communications network supports a location service based on the SUPL information (S604). For example, the multi-SIM device 10 can determine that communications networks which connect to active or available SLPs are the communications networks support the location services. In some embodiments, the multi-SIM device 10 can also determine which communication network supports the location services based on the RAT information. For example, only the communications networks with the normal service status can provide the location services.

The multi-SIM device 10 is then configured to select and request the location service on a SIM that is in connection with the communications network supporting the location services (S606). The multi-SIM device 10 can select a SIM that is in connection to the location service supported communication network for initiating and requesting for the location services. Step S606 are detailed in FIG. 7.

Figure 7:
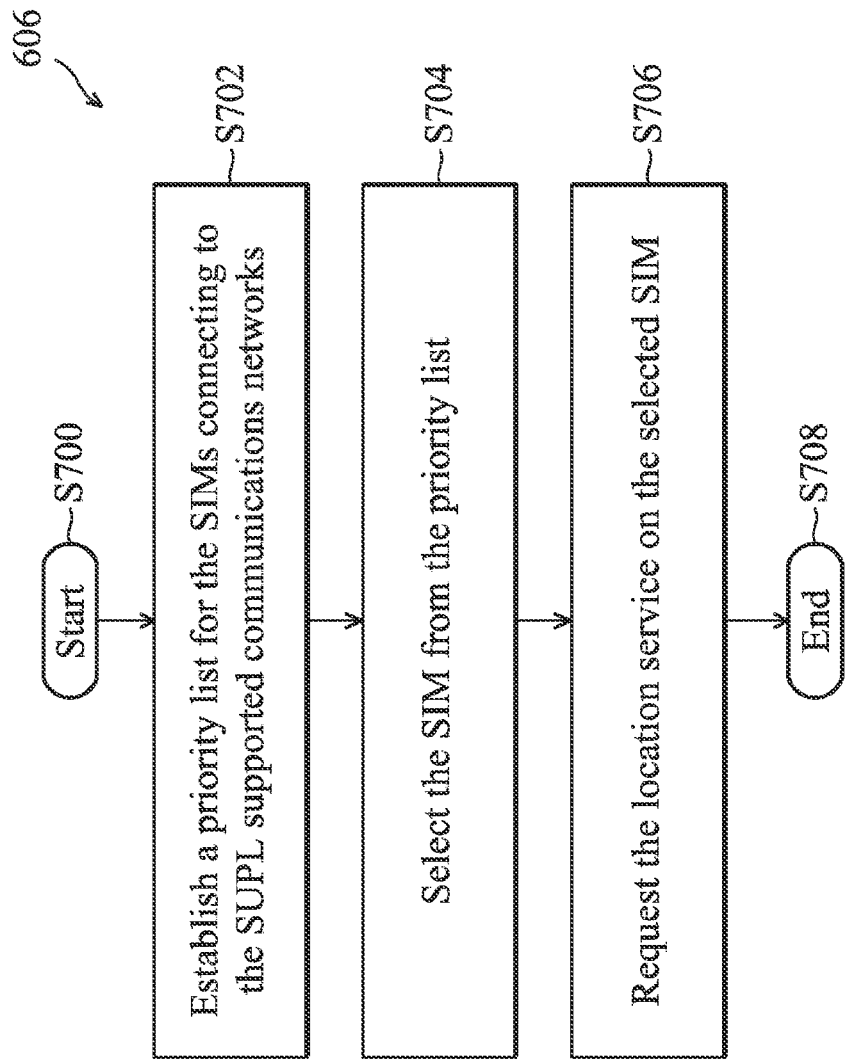
FIG. 7 is a block diagram of a multi-SIM device 10 according to another embodiment of the invention.

FIG. 7 is a flowchart of a selection method of implementing Step S606, selecting a SUPL-capable SIM from a priority list for providing the location services.

Firstly, the multi-SIM device 10 is configured to establish the priority list of the SUPL-capable SIMs based on the SUPL information and the RAT information (S702). The multi-SIM device 10 establishes the priority list based on the data rates, the supported SUPL versions of the SLP servers, user preference, supported SUPL positioning methods of the SLP servers, other predefined factors such as charging rates, roaming (VPLMN) functions, or a combination thereof.

Next, the multi-SIM device 10 is configured to select a highest priority one from the priority list for delivering the location services (S704). Upon receiving a location service request either from an end user or an application program, the multi-SIM device 10 can select the first SIM on the priority list and set it as a preferred SIM card for the location services.

The multi-SIM device 10 is subsequently configured to request the location service on the selected SIM (S706).

The selection method 7 is then completed and exited (S708).

Figure 8:
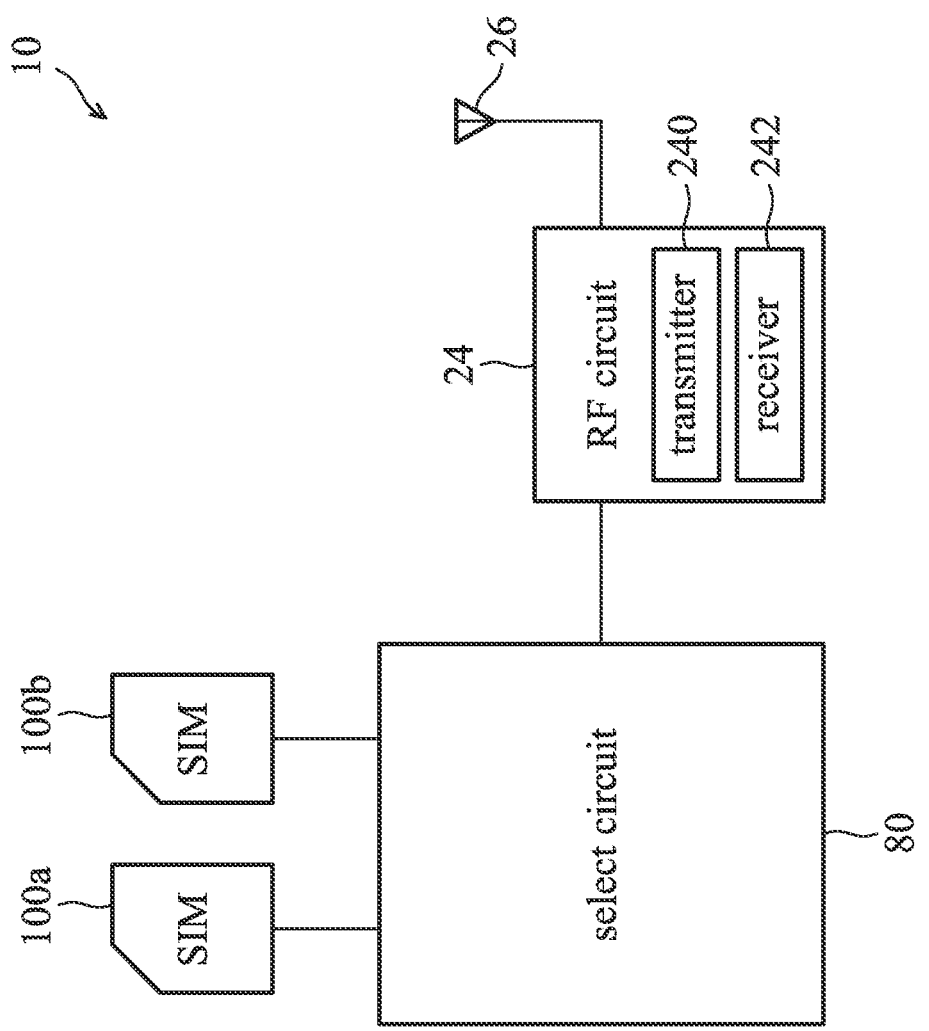
FIG. 8 is a block diagram of a multi-SIM device 10 according to yet another embodiment of the invention.

FIG. 8 is a block diagram of a multi-SIM device 10 according to yet another embodiment of the invention, incorporated in the communications environment 1 in FIG. 1. The multi-SIM device 10 includes two SIM cards 100a and 100b, a select circuit 80, an RF circuit 24 containing a transmitter 240 and a receiver 242, and an antenna 26.

The SIM 100a subscribes to the PLMN A and the SIM 100b subscribes to the PLMN B. Upon receiving a location service request from an end user or an application program, the receiver 242 is configured to acquire SUPL information from the corresponding communications network which each SIM is in connection with. The select circuit 80 is then configured to determine which communications network supports a location service based on the SUPL information and select a SIM that camps on the SUPL-supported communications network for establishing a SUPL session. In some embodiments, the select circuit 80 is further configured to establish a priority list which prioritizes SIMs connecting to the SUPL-supported communications networks, and select the highest priority SIM from the priority list for delivering the location services. The transmitter 240 is configured to request the location service on the selected SIM by sending a SUPL initialization message on the selected SIM, which contains a cell ID of a neighboring base station of the multi-SIM device 10.

The multi-SIM device 10 in FIG. 8 adopts the select circuit 80 to select a SIM from a list of SUPL-capable SIMs to deliver the location services, avoiding possible SUPL version fallbacks and providing an increased user experiences.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The term "or" used herein is intended to mean an inclusive "or" rather than an exclusive "or." That is, unless specified otherwise, or clear from the context, the phrase "X employs A or B" is intended to mean any of the natural inclusive permutations. In addition, the articles "a" and "an" as used in this application and the appended claims should generally be construed to mean "one or more" unless specified otherwise or clear from the context to be directed to a singular form.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, adopted by a multi-SIM device, comprising:
acquiring, by the multi-SIM device, Radio Access Technology (RAT) information and Secure User Plane Location (SUPL) information from each corresponding communications network which each SIM is in connection with;

determining, by the multi-SIM device, which communications network is currently supporting a location service based on the SUPL information;

establishing a priority list which prioritizes SIMs according to the RAT information and the SUPL information;

selecting a SIM from the priority list according to a priority thereof; and requesting, by the multi-SIM device, the location service on the SIM.

2. The method of claim 1, wherein the RAT information includes a service status or a data rate supported by the corresponding communication network, and the SUPL information includes at least one of a SUPL version, a SUPL Location Platforms (SLP) server status and a SUPL positioning method supported by the corresponding communications network.

3. The method of claim 2, wherein the step of the establishing the priority list comprises:

establishing the priority list according to the SUPL information.

4. The method of claim 2, wherein the step of the establishing the priority list comprises:

establishing the priority list according to data rates of the communications networks which support the location service.

5. The method of claim 2, further comprising:

removing a first SIM from the priority list after the multi-SIM device fails to acquire the location service on the first SIM.

6. The method of claim 2, wherein the step of the selecting the SIM from the priority list comprises:

when no SIM is on the priority list, determining whether a SUPL version fallback can be performed on a second SIM among all SIMs; and selecting the SIM which the SUPL version fallback can be performed thereon.

7. The method of claim 1, wherein the SUPL information includes a SUPL version supported by the corresponding communications network.

8. The method of claim 1, wherein the steps of the acquiring the SUPL information, the determining which communications network supports the location service, and the requesting the location service on the SIM are performed when being powered up.

9. The method of claim 1, wherein the steps of the acquiring the SUPL information, the determining which communications network supports the location service, and the requesting the location service on the SIM are performed when a service status of a second SIM in all SIMs is changed.

10. The method of claim 1, wherein the steps of the acquiring the SUPL information, the determining which communications network supports the location service, and the requesting the location service on the SIM are performed when receiving a request for the location service.

11. A multi-SIM device, comprising:

a plurality of SIMs, wherein each SIM is configured to connect with a corresponding communications network;

a receiver, configured to acquire Radio Access Technology (RAT) information and Secure User Plane Location (SUPL) information from the corresponding communications network which each SIM is in connection with;

a select circuit, configured to determine which communications network is currently supporting a location service based on the SUPL information, establish a priority list which prioritizes SIMs according to the RAT information and the SUPL information, and select a SIM from the priority list according to a priority thereof; and a transmitter, configured to request the location service on the SIM.

12. The multi-SIM device of claim 11, wherein the RAT information includes a service status or a data rate supported by the corresponding communication network, and the SUPL information includes at least one of a SUPL version, a SUPL Location Platforms (SLP) server status and a SUPL positioning method supported by the corresponding communications network.

13. The multi-SIM device of claim 12, wherein the select circuit is configured to establish the priority list according to the SUPL information.

14. The multi-SIM device of claim 12, wherein the select circuit is configured to establish the priority list according to data rates of the communications networks which support the location service.

15. The multi-SIM device of claim 12, wherein the select circuit is configured to removing a first SIM from the priority list after the multi-SIM device fails to acquire the location service on the first SIM.

16. The multi-SIM device of claim 12, wherein the select circuit is further configured to:

when no SIM is on the priority list, determine whether a SUPL version fallback can be performed on a second SIM among all SIMs; and select the SIM which the SUPL version fallback can be performed thereon.

17. The multi-SIM device of claim 11, wherein the SUPL information includes a SUPL version supported by the corresponding communications network.

18. The multi-SIM device of claim 11, wherein when being powered up, the receiver is configured to acquire the SUPL information, the select circuit is configured to determine which communications network supports the location service, and transmitter is configured to request the location service on the SIM.

19. The multi-SIM device of claim 11, wherein when a service status of a second SIM in all SIMs is changed, the receiver is configured to acquire the SUPL information, the select circuit is configured to determine which communications network supports the location service, and transmitter is configured to request the location service on the SIM.

20. The multi-SIM device of claim 11, wherein when receiving a request for the location service, the receiver is configured to acquire the SUPL information, the select circuit is configured to determine which communications network supports the location service, and transmitter is configured to request the location service on the SIM.

* * * * *